(12) United States Patent
Tanner et al.

(10) Patent No.: US 6,621,014 B1
(45) Date of Patent: Sep. 16, 2003

(54) LOAD SENSITIVE, VARIABLE SPEED MECHANICAL DYNAMICS ADJUSTING SYSTEM

(75) Inventors: Max W. Tanner, Blackfoot, ID (US); Lynn M. Turner, Blackfoot, ID (US)

(73) Assignee: E. M. Tanner & Sons, Inc., Blackfoot, ID (US)

( * ) Notice: Subject to any disclaimer, the term of this patent is extended or adjusted under 35 U.S.C. 154(b) by 340 days.

(21) Appl. No.: 09/687,224

(22) Filed: Oct. 13, 2000

(51) Int. Cl.$^7$ .................. G01G 13/06; G01G 19/08; B07B 13/05

(52) U.S. Cl. .................. 177/121; 177/136; 209/667; 222/77

(58) Field of Search ............... 177/121, 136, 177/25.18; 222/55, 56, 77; 209/667, 671

(56) References Cited

U.S. PATENT DOCUMENTS

| | | | |
|---|---|---|---|
| 2,659,564 A | 11/1953 | Gibson | 249/58 |
| 3,047,127 A | 7/1962 | McGow | 198/160 |
| 3,165,195 A | 1/1965 | Sass et al. | 198/37 |
| 3,679,010 A | 7/1972 | Bullivant | 177/16 |
| 3,720,039 A * | 3/1973 | Warkentin | 177/121 |
| 3,802,522 A | 4/1974 | Thompson et al. | 177/121 |
| 3,957,126 A | 5/1976 | Hobart | 177/122 |
| 3,985,266 A | 10/1976 | Wright, Jr. | 222/22 |
| 4,065,911 A | 1/1978 | Fagan | 53/53 |
| 4,111,272 A | 9/1978 | Ricciardi et al. | 177/50 |
| 4,475,669 A | 10/1984 | Wahl | 222/55 |
| 4,595,125 A * | 6/1986 | Alwerud | 222/55 |
| 4,615,403 A * | 10/1986 | Nakamura | 177/121 |
| 4,679,641 A | 7/1987 | Kawakami | 177/114 |
| 4,751,974 A | 6/1988 | Kawakami | 177/114 |
| 4,762,252 A | 8/1988 | Hyer et al. | 222/56 |
| 4,907,720 A * | 3/1990 | Henson et al. | 222/55 |
| 5,006,995 A * | 4/1991 | Toschi et al. | 222/55 |
| 5,007,561 A | 4/1991 | Wahl et al. | 222/55 |
| 5,148,943 A * | 9/1992 | Moller | 222/55 |
| 5,261,743 A * | 11/1993 | Moller | 222/63 |
| 5,359,154 A * | 10/1994 | Tsukasa et al. | 177/121 |
| 5,384,436 A * | 1/1995 | Pritchard | 177/136 |

* cited by examiner

*Primary Examiner*—Randy Gibson
(74) *Attorney, Agent, or Firm*—Kirton & McConkie; Michael F. Krieger

(57) ABSTRACT

A system for sensing loads and varying the dynamics of mechanical devices to accommodate various load weights is disclosed. The system comprises a load receiving device, a load translocator, a load sensing device, and a control unit for processing information sent to it by the load sensing device. The control unit receives and calculates information corresponding to a load weight and varies the speed of a motor and/or hydraulic drive coupled to the mechanical devices translocating the load. This allows for more efficient and consistent load transfers. The system, as described herein, may be applied to several mechanical devices or systems. Specifically as described herein, the system is applied to a conveyor and sorting apparatus which comprises a hopper having a first and a second end, and further comprising a conveyor for transporting the produce from the first end to the second end, a roller bed, coupled to the second end of the hopper. The load sensing device senses and detects a load weight in the hopper and subsequently, through a control system and motor, adjusts the speed of the roller bed and/or conveyor to accommodate a particular load. The apparatus further includes a hopper elevator, coupled to the hopper and the load sensing device, to elevate or lower the first end of the hopper.

11 Claims, 3 Drawing Sheets

LOAD SENSITIVE, VARIABLE SPEED MECHANICAL DYNAMICS ADJUSTING SYSTEM

BACKGROUND OF THE INVENTION

The present invention relates generally to produce conveyor and sorting systems and, more specifically, to a produce and sorting conveyor system that is capable of sensing heavy loads and altering the speed of the machinery accordingly.

Farm equipment that is used to sort and grade produce is well known in the art. Specifically, sorting and grading systems that handle tuber and root produce are well known and have been specifically designed to handle the particular types of problems inherent in transporting and sorting such tuber and root produce. For example, tuber and root produce often has dirt, rocks and other debris that must be sifted and removed from the produce prior to sorting. Further still, roots and tubers typically grow to varying levels of maturity and size that require small young roots of little commercial value to be removed during sorting much like the dirt, rock, and debris.

Additionally, root and tuber type sorting apparatus must be able to handle large loads of produce being sorted in a cost effective and efficient manner that not only removes the great bulk of the dirt, rock, and debris inherent in the harvesting of such roots and tubers, but also does not bruise the produce or damage it in any way that would affect its commercial value at the time of sale of such produce.

Some prior art machinery include a hopper from which the recently harvested produce is then placed on a conveyor belt which transports the produce to the sorting location. This type of machinery typically comprises a series of rollers that include fingers or tines that move the produce from the conveyor belt to the sorting rollers and then to a subsequent conveyor belt that either removes the debris and rejected produce because of improper size or to conveyors that take it for storage and sale. There is sufficient space between the rollers that the dirt and debris fall quickly through without losing the commercial product. Next, the produce is transported to another series of rollers that further sort the produce according to size and weight, with the rejected matter removed. Finally, the remaining produce is transported via storage conveyors to a holding bin or vehicle adjacent the sorting apparatus so that the produce can be taken to the proper storage facility or transport location from the field.

Unfortunately, although many of the problems inherent with sorting through root and tuber type produce have been overcome, there are still other problems that have yet to be eliminated. For example, the speed with which the sorting and transport of acceptable produce occurs is still limited by the ability of the machines to sort through the produce in a quick and efficient manner. One problem facing the sorting of such produce effectively and efficiently is that large loads of produce can be placed at the hopper portion of the conveyor prior to reaching the rollers. When this large portion of produce is placed on the conveyor, a large pile of produce and material is transported up the conveyor into the rollers. This large quantity of matter typically forms multiple layers of debris and produce on the rollers and cannot be sorted effectively. Since most roller systems require that the produce pass in a single uniform layer allowing unacceptable produce to be disposed of through the gaps in the rollers, the upper portions of the pile of produce do not have an opportunity to fall through the rollers transporting the bottom of the pile and are therefore not sorted. Instead, the unsorted upper levels pass by the roller tines to the final conveyors. Further still, rollers can become caked with debris such as mud and dust, efficiently decreasing the size of produce and debris that can pass through the openings between the roller.

Accordingly, what is needed is a produce sorting apparatus that is able to handle large loads of produce at an initial loading phase without experiencing clogging or overwhelming the sorting apparatus so that proper sorting will occur.

SUMMARY OF THE INVENTION

The present invention incorporates a load sensing mechanism which signals to a control unit a particular load weight, such as produce, etc. The control unit calculates the optimal speed for processing that amount of load and varies the speed of the motor or motors that actuate the translocation of the load. When no load is sensed, the entire unit can be switched off. When an above-normal load is sensed, speeds are adjusted accordingly to accommodate the increased load. This load sensitivity allows the load to be processed with the greatest amount of consistency and efficiency.

The present invention features a load sensitive, mechanical dynamics adjusting system. This system comprises a) means for receiving a load at a first point; b) means for translocating the load from the first point to at least a second point; c) means for sensing the load weight at any point; d) means for electrically transmitting the load weight information detected by the means for sensing; and d) means adjusting the speed of the means for translocating the load as needed. The means for receiving a load can be any type of machinery assembly or apparatus capable of receiving a load and physically moving the load, such as a hopper assembly and conveyor, a duster, a tractor, or any other machinery known by those skilled in the art. The means for translocating can be a conveyor or roller or any other apparatus capable of moving a load from one point to another. The means for sensing the load may be a strain gauge or any other type of instrument capable of sensing or detecting a load. Those skilled in the art will not be limited by the disclosure herein.

The present invention further features a load sensitive, mechanical dynamics adjusting system which comprises a) a load receiving member for receiving a load at a first point; b) at least one load translocator for moving the load from a first point to at least a second point, the load translocator comprising at least one mechanical load moving device coupled to a variable speed motor; c) a load sensing device coupled to the load receiving member, the load sensing device capable of sensing a load weight and transmitting a signal corresponding to the load weight; and d) a control unit electrically connected to the load sensing device, the control unit receiving and calculating the signal corresponding to the load weight as transmitted by the load sensing device, and adjusting the variable speed motor as needed, thus adjusting the speed of the at least one load translocator. This feature further includes an inverter and/or hydraulic drive allowing the motor to attain different speeds.

The load sensitive, dynamics adjusting system is capable of sensing loads and adjusting the speed of the motor according to the weight of these loads. If the load is particularly heavy, the load sensing device will sense this and send such information to the control unit where the information is calculated and processed. Subsequently, the control unit adjusts the speed of the motor accordingly so that the heavy load may more easily be accommodated. If there is no load or a substantially weightless load, the load sensing device detects this and sends this information to the control unit. Similar to the adjusting of the variable speed motor due to a heavy load, the control unit again adjusts the speed of the motor, in this case to a stopped position. The control unit is capable of adjusting the speed of the variable speed motor to several various speeds as needed to accommodate a particular load.

In accordance with a preferred embodiment of the present invention, an apparatus for conveying and sorting produce is disclosed. The apparatus comprises a) a hopper having a first and a second end; b) a conveyor for transporting the produce from the first end to the second end; c) a roller bed, coupled to the second end of the hopper; d) a variable speed motor, coupled to the rollers in the roller bed and the load sensing device, to vary the speed of transport of the rollers in the roller bed; e) a load sensing device, coupled to the hopper, the load sensing device capable of detecting the amount of load on the hopper and transmitting this information; and f) a control unit electrically connected to the load sensing device, the control unit calculating the information received from the load sensing device, wherein the control unit adjusts the speed of the conveyor and roller bed as needed.

In one particular embodiment, the apparatus further comprises a produce conveyor, coupled to a second end of the roller bed. In another embodiment, the apparatus further comprises a first debris removal conveyor, positioned under a portion of the roller bed. A second debris conveyor may also be provided, which is positioned below a second portion of the roller bed. The roller bed may also comprise a plurality of roller sections. At least one roller section serves primarily to filter out dirt from the produce and another section primarily serves to filter out produce of a given size for removal.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF SPECIFIC EMBODIMENTS

Figure 2:
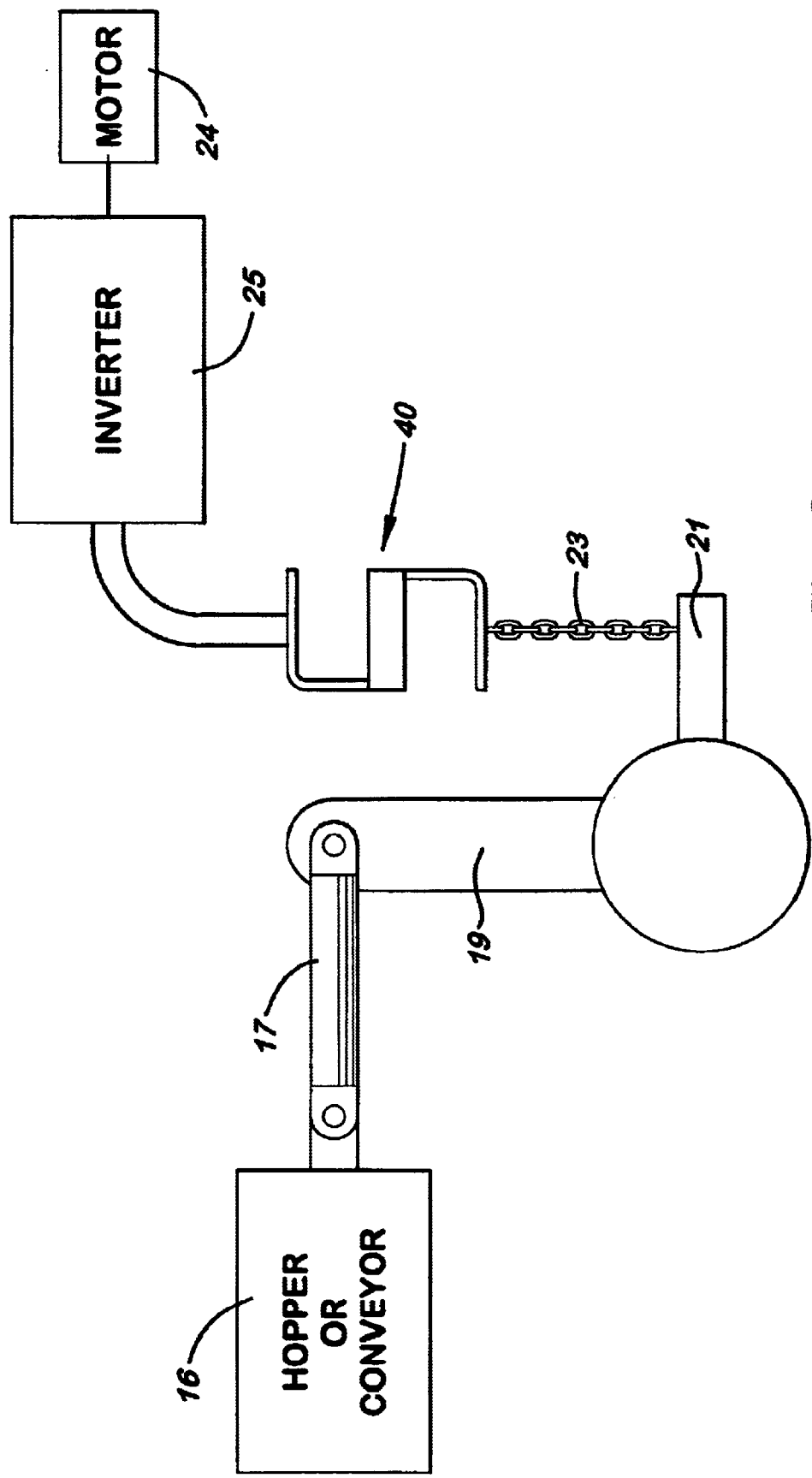
FIG. 2 illustrates the components of the system.
Figure 3:
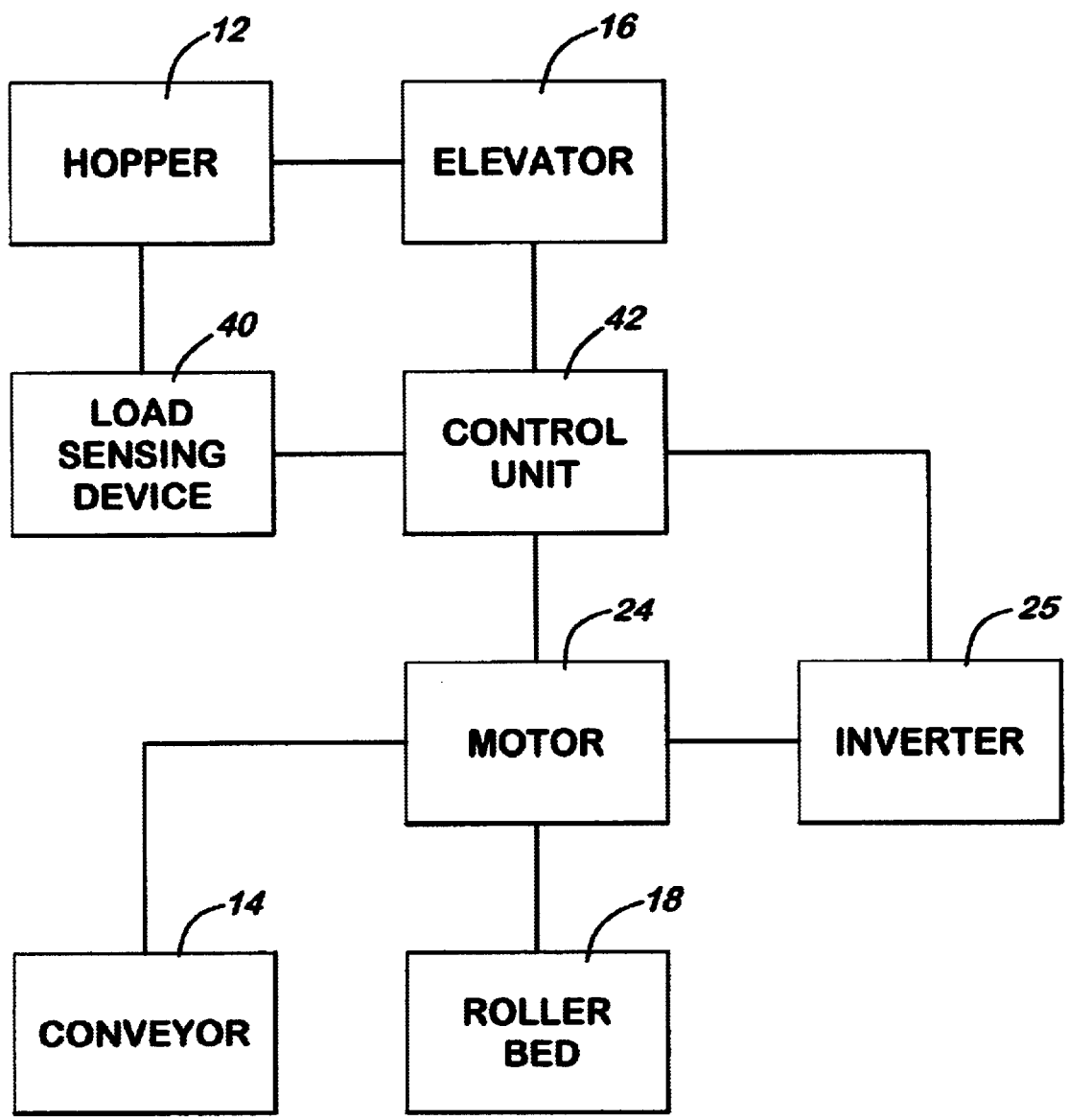
FIG. 3 illustrates a block diagram of the roller system and its load sensitive variable speed management system in accordance with the present invention.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 3, is not intended to limit the scope of the invention, as claimed, but is merely representative of embodiments of the invention.

The specific embodiments of the invention will be best understood by reference to the drawings, wherein like parts are designated by like numerals throughout.

Figure 1:
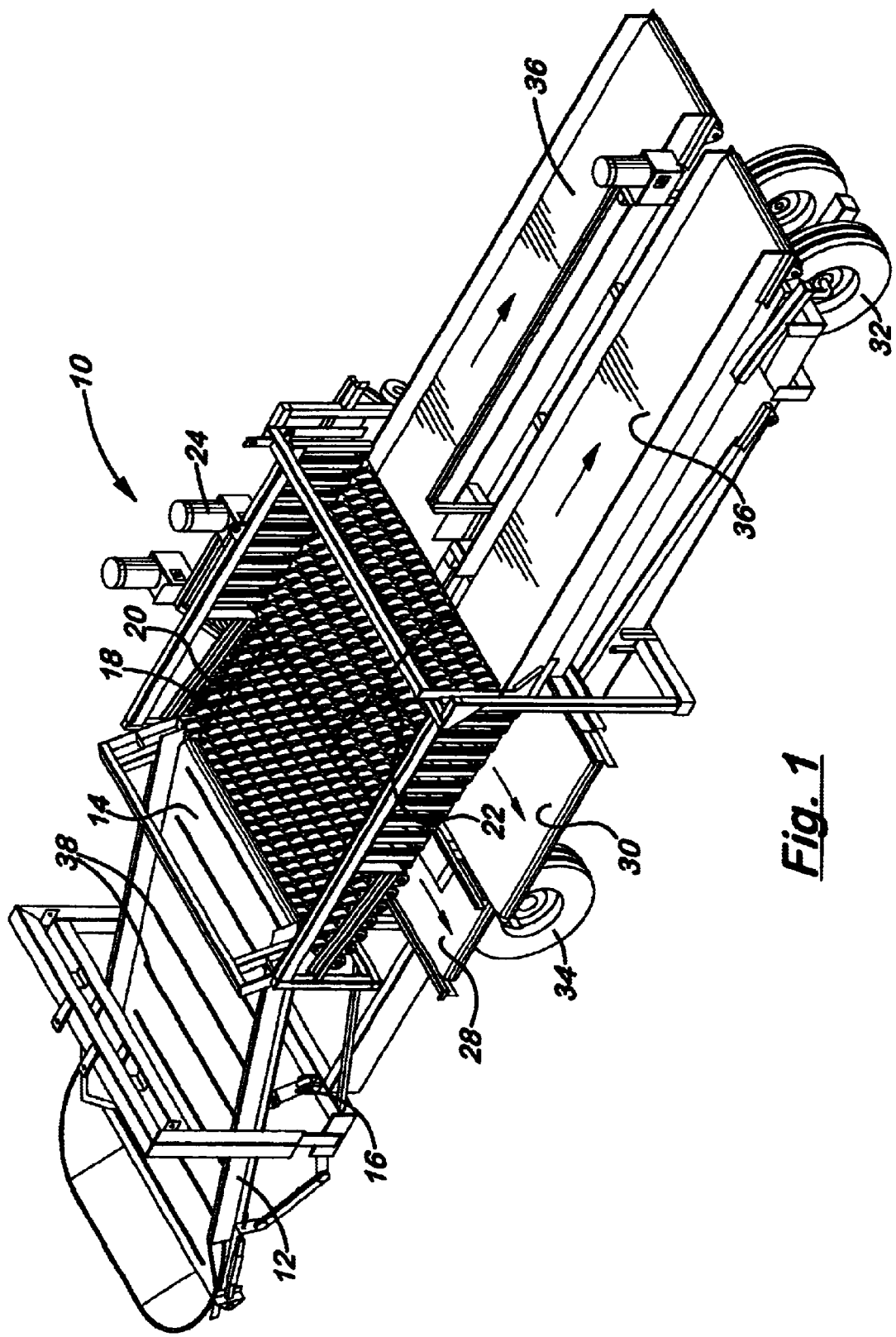
FIG. 1 illustrates a perspective view of a variable speed load sensitive produce conveyor apparatus in accordance with the present invention.

FIG. 1 illustrates a perspective view of a variable speed load-sensitive produce conveyor apparatus 10 in accordance with the present invention. The apparatus 10 is useful in accepting a load of produce, such as root or tuber type vegetables that not only have large amounts of dirt and debris present within the produce, but also small and undeveloped produce that is unfit for commercial purposes and must be removed during the sorting process. It is also possible that the produce sorting and conveyor apparatus 10 can be used to sort other types of produce and other types of non-produce items that have a uniform size and shape to them, but need to be sorted and conveyed for storage or transport. The tuber and root produce products are like those such as potatoes, beets, onions, carrots, turnips, and the like, but are not limited thereto.

Apparatus 10 includes a hopper 12 located at a first end and further includes a load conveyor 14. Load conveyor 14 typically is an endless loop conveyor belt. Hopper 12 further includes a hydraulic hopper elevator 16, which is useful in elevating hopper 12 during operation to optimize the transport of produce from the conveyor through the apparatus 10. Load conveyor 14 transports the produce to a roller bed 18, which comprises a first pass roller section 20 and a second pass roller section 22.

First pass roller section 20 includes a plurality of rollers. One type of suitable roller is described in commonly assigned U.S. Pat. No. 6,241,100 Laterally Reinforced Produce Roller, filed Aug. 31, 1999, incorporated by reference for all purposes, which discloses a set of rollers typically utilized in a sorting and conveyor apparatus such as that of apparatus 10 of the present invention. The rollers found in first pass roller section 20 are of a first size that typically allow the larger produce items to pass over without falling between the slits and openings that are formed within the bank of rollers of section 20. This first section allows for dirt and debris that is undesirable to filter through the openings of roller section 20 and then be carried away without being sent toward a storage unit used to store and transport the desired produce. Also, produce that is too small for commercial use typically falls through the openings in the rollers and is removed accordingly. Roller sections 20 and 22 are coupled to a motor 24, which is utilized to drive the rollers in the direction pointed by the arrow in FIG. 1. The dirt and debris that falls between the rollers in section 20 is carried away by conveyor belt 28.

Next, the produce that remains and has not fallen through the openings in the first roller section 20, then passes through the second roller section 22. Roller section 22 removes unwanted debris that failed to pass through the first roller section 20 as well as undesirable produce that is too small for commercial value. This refuse is carried away by conveyor belt 30, which is situated adjacent conveyor belt 28 and below roller bed 18.

Finally, the produce that successfully passes over the roller bed is then deposited upon conveyor belt 36, which then carries the produce to a hopper or storage bin for storage or transport from the field.

Apparatus 10 is also designed to be mobile, or at least transportable through the crop field, and hence, lead tires 32 and rear tires 34 are provided to support apparatus 10 and allow it to be transported over most terrain.

To optimize the sorting of produce, apparatus 10 must be able to consistently deliver a uniform single layer of produce over the roller beds 18. As can be seen in FIG. 2, this may be accomplished by maintaining the load on a hopper or conveyor 16. This monitor occurs when a weight is placed on hopper 16 driving hydraulic ram 17 to push against arm 19. Movement of arm 19 forces lever 21 to pull downward on connector 23 which is attached to the bottom of load sensor 40. Load sensor 40 senses the downward pressure exerted on its lower end and sends a signal to a processor which either directly alters the speed of the motor or causes an inverter 25 to alter the speed. This is done using a load sensing device 40, such as an S-type load cell.

Returning now to FIGS. 1 and 3, during heavy loads, a hopper elevator or conveyor elevator 16 may be adjusted to raise or lower hopper 12 to allow a larger volume of produce to be conveyed from the hopper bottom portion to roller bed 18 in the direction of the shown arrows. Although hopper elevator 16 is selected as a hydraulic lift member, other means for elevating and lowering hopper 12 are acceptable to one skilled in the art. For example, gears and pulleys can be utilized to raise and lower hopper 12 in an alternative embodiment to the use of hydraulic presses. Furthermore, conveyor 14 can include transport strips 38 that enable conveyor 14 to convey the produce and debris more efficiently within hopper 12 roller bed 18.

With a larger or smaller amount of produce being delivered to roller bed 18, motor 24 is caused to accelerate or decelerate respectively, thereby adjusting the rotation of the rollers within roller bed 18. The rollers are synchronized to the motor 24 in order to transport a uniform single layer of produce over roller bed 18 to conveyors 36. Further still, load conveyor 14 is also synchronized with the motor 24. The rollers and load conveyor 14 are capable of various adjustable speeds according to the load sensed by the load sensing device 40 so that the speeds of either or both may be adjusted to accommodate different load weights introduced. Thus, since the speeds of both conveyor 14 and the rollers in roller bed 18 can be varied according to the load sensed by the load sensing device 40, the processing of produce can be performed at a more rapid rate and in a more efficient and consistent manner.

Load sensing device 40 detects or senses different load weights. As these different load weights are detected, load sensing device 40 transmits a signal to control unit 42. Control unit 42 receives the signal transmitted by load sensing device 40 and calculates or processes the signal. As the signal is processed, the control unit 42, which is in communication with motor 24, adjusts the speed of motor 24 according to the load weight introduced. Motor 24 adjusts the speed of roller bed 18 and conveyor 14 to accommodate the change in load, thus providing a uniform and consistent transfer of load through apparatus 10. Motor 24 may be a variable speed motor connected directly to the signal processor or may be a motor which utilizes an inverter drive to measure the voltage from the signal processor allowing the motor or hydraulic drive to change speeds.

FIG. 2 illustrates the load sensing and speed variable control system utilized within the present invention. Specifically, hopper 12 is coupled to a load sensing device 40, which can determine the load that is placed on hopper 12 at any particular time. One type of sensor is a strain gauge that would mount to the frame of apparatus 10 near the hopper where the strain of the load within hopper 12 causes the frame to deflect and be measured by the strain gauge. An electrical signal from the strain gauge is sent to a control unit 42, which interprets the electrical signal and converts it to a meaningful load value for further processing. This load value is utilized to determine an appropriate speed for either conveyor 14 or roller bed 18. As discussed above, motor 24 turns and adjusts the speeds of the rollers in roller bed 18 as well as conveyor 14. The motor can be a variable speed motor, or may utilize an inverter drive 25 or hydraulic motor pump to control the speed of the motor. In this embodiment, the load value is utilized to determine what speed is required so that a uniform, single layer of produce is transported across the surface of roller bed 18 for selection and conveying to conveyors 28, 30, and 36. Should the speed of the rollers in roller bed 18 be too great or too slow, the produce may be deposited too rapidly or not rapidly enough such that non-commercially valuable produce and debris passes over the bed 18 to conveyor 36 without being selected out and disposed of in the desired manner. If the speed is too slow, then not enough produce will be sorted and conveyed. In either event, apparatus 10 would fail to process as much produce in as fast as and as efficient a manner as is desirable in order to keep up with the harvesting of the produce.

The system may also be used in machinery such as a duster. A potato duster using a rotating drum has a conveyor that delivers the growth enhancers, insecticide, etc., to the potatoes in the drum. In this embodiment, the load sensor would be attached to the conveyor feeding the drum frame. When a large load is sensed, the conveyor feeding the dust into the duster is sped up. The drum itself could also be sped up to assure even dusting of all produce passing through the drum.

The present invention may be embodied in other specific forms without departing from its spirit or essential characteristics. For example, load sensing device 40 could be incorporated into a duster assembly wherein load sensing device 40 could monitor and control the flow of fluid. In reality, any type of apparatus of system in which a weighted load or item is being translocated from one point to another may utilize the technology as described herein. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A load sensitive, mechanical dynamics adjusting system comprising:

a load receiving member configured to receive a load;

a sorting mechanism configured to selectively sort the load;

a load translocator coupled to the load receiving member and to the sorting mechanism, wherein the load translocator is configured to move the load from the load receiving member to the sorting mechanism;

a motor coupled to at least one of:

(i) the load translocator to drive the load translocator; and (ii) the sorting mechanism to drive the sorting mechanism;

a load sensing device coupled to at least one of (i) the load receiving member and (ii) the sorting mechanism, wherein the load sensing device is configured to sense a current weight of the load and transmit a signal corresponding to the current load weight; and a control unit electrically connected to the load sensing device and to the motor, the control unit configured to receive the signal and cause the motor to adjust a speed of at least one of (i) the load translocator and (ii) the sorting mechanism.

2. The load sensitive, dynamics adjusting system of claim 1, wherein the load receiving member includes at least one of:
   (i) a hopper;
   (ii) a conveyor;
   (iii) a duster; and
   (iv) a tractor.

3. The load sensitive, dynamics adjusting system of claim 1, wherein the load receiving member and the load translocator are part of a duster apparatus.

4. The load sensitive, dynamics adjusting system of claim 1, wherein the motor is configured to stop when the load sensing device senses the current weight of the load as a substantially zero load weight.

5. The load sensitive, dynamics adjusting system of claim 1, further comprising an inverter drive and/or hydraulic drive allowing for variable speeds of the motor.

6. The load sensitive, dynamics adjusting system of claim 1, wherein the load translocator comprises at least one mechanical load moving device coupled to the motor.

7. The load sensitive, dynamics adjusting system of claim 1, wherein the load translocator includes a conveyor.

8. The load sensitive, dynamics adjusting system of claim 1, wherein the sorting mechanism includes a plurality of rollers.

9. The load sensitive, dynamics adjusting system of claim 1, wherein the load is continuous by nature and variable by weight.

10. The load sensitive, dynamics adjusting system of claim 1, wherein the load translocator includes a roller.

11. The load sensitive, dynamics adjusting system of claim 1, wherein the load sensing device comprises a strain gauge.

* * * * *